United States Patent [19]

McKee et al.

[11] Patent Number: 4,739,010
[45] Date of Patent: Apr. 19, 1988

[54] THERMOPLASTIC MOLDING COMPOSITIONS

[75] Inventors: Graham E. McKee, Weinheim; Georg N. Simon, Limburgerhof; Dietrich Lausberg, Ludwigshafen; Friedrich Kleber, Worms; Karl Schlichting, Bobenheim-Roxheim, all of Fed. Rep. of Germany

[73] Assignee: BASF Aktiengesellschaft, Ludwigshafen, Fed. Rep. of Germany

[21] Appl. No.: 941,340

[22] Filed: Dec. 15, 1986

[30] Foreign Application Priority Data

Jan. 20, 1986 [DE] Fed. Rep. of Germany ....... 3601421

[51] Int. Cl.$^4$ ............................................. C08L 51/00
[52] U.S. Cl. ........................................ 525/64; 525/67
[58] Field of Search .................... 525/64, 67, 902, 69, 525/148, 176

[56] References Cited

U.S. PATENT DOCUMENTS 3,919,353 11/1975 Castelnuovo et al. ................ 525/64
4,034,013 7/1977 Lane .................................... 525/286
4,617,345 10/1986 Sederel ................................. 525/67

*Primary Examiner*—Theodore E. Pertilla
*Attorney, Agent, or Firm*—Oblon, Fisher, Spivak, McClelland & Maier

[57] ABSTRACT

Thermoplastic molding compositions which contain
(A) 50–99% by weight of a polyalkylene terephthalate and/or of a polycarbonate and
(B) 1–50% by weight of an elastomeric polymer having epoxy and/or carboxyl groups on the surface, wherein component (B) is a graft polymer prepared by emulsion polymerization and has a glass transition temperature of below 0° C. and a gel content of not less than 50%, have a high impact strength even at low temperatures.

4 Claims, No Drawings

THERMOPLASTIC MOLDING COMPOSITIONS

The present invention relates to thermoplastic molding compositions which contain
(A) 50–99% by weight of a polyalkylene terephthalate and/or of a polycarbonate and
(B) 1–50% by weight of an elastomeric polymer having epoxy or carboxyl groups on the surface
and to moldings prepared therefrom.

The addition of elastomeric polymers to thermoplastic polyesters to improve the impact strength is known per se.

DE-A- No. 2,348,377 describes graft polymers having an inner core which is based on butadiene and an outer graft sheath of styrene/methyl methacrylate, which are suitable for increasing the impact strength of polyesters.

US-A- No. 4,283,326 describes blends of polyester, mica and rubber, wherein the rubber has a hard outer sheath and a glass transition temperature of not less than 20° C. Epoxy groups may be present on the surface of the outer sheath. DE-A- No. 2,650,870 similarly describes mixtures of polyesters and multistage polymers. The latter are based on a rubberlike first stage having a glass transition temperature below 10° C. and a final, epoxy-containing stage having a glass transition temperature not less than 50° C., so that the polymer has a film forming temperature of not less than 50° C. These multistage polymers are thus no longer rubberlike polymers. In addition the molding compositions described in US-A- No. 4,283,326 or DE-A- No. 2,650,870 have the disadvantage that, owing to the hard graft sheath of the polymers added to the polyesters the mechanical properties, in particular the impact strength (including under biaxial stress), are not satisfactory.

DE-A- No. 2,622,876 describes molding compositions of polyesters or polycarbonates and rubberlike polymers having epoxy or carboxyl groups on the surface. The rubberlike polymers have melt indices within the range 0.5–1000 g/10 min according to DIN No. 53,735 (190° C., 2.16 kg loading) and are supposed to be finely divided. Nothing is said about the importance of a high gel content. In addition, the mechanical properties of these molding compositions and in particular the solvent resistance thereof are likewise not satisfactory. Furthermore, delamination occurs in the production of large-area shapes, and the coatability of moldings made from these molding compositions is not satisfactory.

It is an object of the present invention to provide molding compositions composed of polyesters and/or polycarbonates and elastomeric polymers, which have a high impact strength (including biaxial), in particular at low temperatures, improved fluency, high surface quality and good coatability.

We have found that this object is achieved, surprisingly, with thermoplastic molding compositions which contain
(A) 50–99% by weight of a polyalkylene terephthalate and/or of a polycarbonate and
(B) 1–50% by weight of an elastomeric polymer having epoxy and/or carboxyl groups on the surface, wherein component (B) is a graft polymer prepared by emulsion polymerization and has a glass transition temperature of below 0° C. and a gel content of not less than 50%.

Preferred compositions of this type are revealed in the subclaims.

The thermoplastic molding compositions according to the invention have in particular a high impact strength (in particular biaxial impact strength) and surface quality and are readily coatable.

The polyalkylene terephthalates used as component A have a viscosity index of preferably 80–170, in particular 110–150, measured on a 0.5% strength solution in phenol/o-dichlorobenzene (1:1) at 25° C. with an Ubbelohde viscometer in accordance with DIN No. 53,726/8. Preferred polyalkylene terephthalates are derived from alkanediols of 2–6 carbon atoms. The polyesters may also contain up to 10 mol % of portions which are derived from dicarboxylic acids other than terephthalic acid, such as isophthalic acid, alkanedicarboxylic acids of 5–36 carbon atoms, naphthalenedicarboxylic acids, or halogenated aromatic dicarboxylic acids or even branched alkanediols, such as neopentylglycol, 1- or 2-methyl-1,4-butanediol, 2-ethyl-1,6-hexanediol or dimethylbutanediol. In addition the polyesters used may contain up to 1 mol % of not less than tribasic polycarboxylic acids or polyols, such as pyromellitic acid, trimellitic acid, trimethylolpropane or pentaerythritol.

Of particular importance in industry are polyethylene terephthalate and polybutylene terephthalate and mixtures and copolymers thereof.

The aromatic polycarbonates used according to the invention (component A) are known per se. They can be prepared, for example as described in DE-C- No. 1,300,266, by interface polycondensation or, as described in DE-A- No. 1,495,730, by transesterification of diphenyl carbonate with bisphenol A. In place of bisphenol A it is possible to use, for example, up to 30 mol % of other aromatic bishydroxy compounds, in particular 2,2-di(4-hydroxyphenyl)pentane, 2,6-dihydroxynaphthalene, di(4-hydroxyphenyl) sulfone, di(4-hydroxyphenyl) ether, di(4-hydroxyphenyl) sulfide, di(4-hydroxyphenyl)methane, 1,1-di(4-hydroxyphenyl)ethane or 4,4-dihydroxydiphenyl.

Polycarbonates which are suitable for the purposes of the present invention have a relative viscosity (measured at 25° C. on a 0.5% strength by weight solution in dichloromethane) of preferably 1.2–1.5, in particular 1.28–1.40.

The amount of component A in the molding compositions according to the invention is 50–99, preferably 70–97, % by weight. Component A can comprise not only polyesters or polycarbonates alone but also mixtures of these polymer types in any desired proportion.

Component B of the molding compositions according to the invention comprises 1–50, preferably 3–30, % by weight of an elastomeric graft polymer prepared by emulsion polymerization and having a glass transition temperature of less than 0° C., a gel content of not less than 50%, preferably not less than 70%, and epoxy and/or carboxyl groups on the surface.

It is in this connection an essential feature of the invention that the adhesion-promoting epoxy and/or carboxyl groups are present on the surface and that the gel content is not less than 50%.

The epoxy and/or carboxyl groups act as adhesion promoters between the polyester and/or polycarbonate and the graft polymer. Whether this adhesion promotion is based on the formation of covalent chemical bonds or on physical interactions (van der Waals, dipole-dipole etc.) is not certain at present.

The high gel content of the elastomeric polymer brings with it an improvement in the mechanical properties and in the surface quality of the molding compositions. A further effect of the high gel content is that the fluency of the polymers (B) is only very low, so that it is frequently impossible to determine a melt index under standard conditions. On the contrary, the polymers exhibit elastic properties, ie. they react to the action of a shape-changing force with an elastic restoring force (cf. B. Vollmert, Grundriss der makromolekularen Chemie, vol. IV, pp. 85, E. Vollmert, Verlag Karlsruhe 1979).

As a consequence of being prepared in emulsion, the particles of component (B) are present in the form of crosslinked disperse particles.

The elastomeric graft polymers which are based on a rubber which has been prepared in emulsion and has a glass transition temperature of below 0° C. and which have epoxy or carboxyl groups on the surface can be prepared in a conventional manner by emulsion polymerization as described, for example, in Houben-Weyl, Methoden der organischen Chemie, vol. XII. I (1961). The emulsifiers and catalysts which can be used are known per se.

Examples of monomers for preparing the rubber are acrylates, e.g. n-butyl acrylate and 2-ethylhexyl acrylate, methacrylate, butadiene and isoprene. These monomers can also be copolymerized with other monomers such as, for example, styrene, acrylonitrile and vinyl ethers.

Monomers which can bring about a coupling onto component (A) are those which contain (I) epoxy and-/or (II) carboxyl groups. Examples of such monomers are for (I) glycidyl methacrylate, glycidyl acrylate, allyl glycidyl ether, vinyl glycidyl ether and glycidyl itaconate, and for (II) acrylic acid, methacrylic acid and the metal, in particular alkali metal, salts and ammonium salts thereof, maleic acid, maleic anhydride, metal salts of the acid monoethyl ester of maleic acid, fumaric acid, monoethyl fumarate, itaconic acid, vinylbenzoic acid, vinylphthalic acid, salts of monoethyl fumarate, monoesters of maleic acid, fumaric acid and itaconic acid with alcohols ROH, where R has up to 29 carbon atoms, eg. methyl, propyl, isopropyl, butyl, isobutyl, hexyl, cyclohexyl, octyl, 2-ethylhexyl, decyl, stearyl, methoxyethyl, ethoxyethyl and hydroxyethyl.

It is true that maleic anhydride and metal salts (in particular alkali metal and alkaline earth metal salts) of polymerizable carboxylic acids do not have free carboxyl groups, but in their behavior they are so close to the free acids that for the purposes of the present invention they are subsumed under the heading of carboxyl-containing monomers.

The graft polymers prepared by emulsion polymerization (dispersion polymers) can have a plurality of shells where, for example, the core and the outer shell can be the same, except that the outer shell contains additional groups which permit adhesion of component (A). Examples thereof are an inner core of n-butyl acrylate and an outer shell of n-butyl acrylate and glycidyl methacrylate, or an inner core of butadiene and an outer shell of butadiene and glycidyl methacrylate. However, the core and the shell can also be differently constituted, for example the inner core being made of butadiene and the outer core of n-butyl acrylate and glycidyl methacrylate.

It is of course possible for the rubber to be constituted homogeneously, for example to have a single shell made of a copolymer of n-butyl acrylate and glycidyl methacrylate or butadiene and glycidyl methacrylate.

The rubber particles can also be crosslinked. Examples of crosslinking monomers are divinyl benzene, diallyl phthalate and dihydrodicyclopentadienyl acrylate. The proportion of these crosslinkers in component (B) is preferably less than 5% by weight, based on (B).

In addition to the abovementioned elastomeric graft polymers B, the molding compositions according to the invention can also contain other rubbers, in particular ethylene copolymers, which can likewise, although need not, contain epoxy or carboxyl groups.

It is of course also possible to add additives such as, for example, fillers, further compatible plastics, dyes, pigments, antistats, antioxidants, flameproofing agents and lubricants, to name but a few, to the molding compositions. Preferred fillers are frequently those with a reinforcing action, for example glass fibers, asbestos, wollastonite, mica, talcum, chalk and glass balls. These additives are used in active amounts, in general in amounts of up to 30% by weight, based on (A) plus (B), but the amount can also be up to 60% by weight (in particular in the case of fillers).

The components are prepared by mixing the components in a conventional manner. Suitable mixing apparatus is known, so that details need not be given here.

Because the graft polymer is prepared in emulsion it is frequently advantageous to remove the solvent (usually water) before mixing the components. However, it is also possible to feed the aqueous dispersion directly, for example by way of an extruder, into the polymer melt and to draw off the water in the course of its passage through the extruder, for example by means of degassing screws. It will be readily understood that this process can also be practiced on partially dewatered dispersions (for example moist crumbs).

In many cases it has been found to be advantageous to prepare mixtures of elastomer and polyester and/or polycarbonate in a first step and subsequently to add the desired additives in a second step.

This is particularly advantageous in the case of moist elastomers or elastomers in dispersion, since as a result the Vicat softening temperature of the mixture is raised.

The molding compositions according to the invention are highly suitable for producing large-area moldings without delamination. Moreover, the moldings from the molding compositions according to the invention are also readily coatable.

EXAMPLES

Preparation of component B

Components $B_1-B_4$ were prepared by emulsion polymerization, with 70% by weight of butadiene being polymerized in a first stage in the presence of 0.7% by weight of t-dodecylmercaptan. This inner core then had polymerized onto it an outer shell of 30% by weight of n-butyl acrylate or n-butyl acrylate/glycidyl methacrylate (total of butadiene and outer shell = 100%). Between the first and the second stage the approximately 0.1 μm sized particles were agglomerated in a controlled manner by adding an ethyl acrylate/methacrylamide copolymer dispersion (2% by weight of solid constituents, based on solid constituents of the first stage; based on 96% by weight of ethyl acrylate and 4% by weight of methacrylamide). The proportions (in % by weight) of n-butyl acrylate and glycidyl methacrylate are shown in Table 1 below.

TABLE 1

| Component | B₁ | B₂ | B₃ | B₄ |
|---|---|---|---|---|
| n-butyl acrylate | 95 | 92.5 | 90 | 100 |
| glycidyl methacrylate | 5 | 7.5 | 10 | 0 |

The solids content of the dispersion was 40% and the particle size ranged from 0.1 to 0.7 μm. The glass transition temperature of the inner shell was about 80° C. and that of the outer shell −40° C., and the film forming temperature was below 0° C.

Preparation of components $B_5$-$B_7$

In the preparation of these graft polymers, 70% by weight of a 98:2 mixture of n-butylacrylate and dihydrodicyclopentadienyl acrylate were polymerized in a first stage to give the inner core, onto which 30% by weight of n-butyl acrylate or n-butyl acrylate/glycidyl methacrylate were polymerized in a second stage in the ratios listed in Table 2.

TABLE 2

| | (in % by weight) | | |
|---|---|---|---|
| Component | B₅ | B₆ | B₇ |
| n-butyl acrylate | 95 | 92.5 | 100 |
| glycidyl methacrylate | 5 | 7.5 | 0 |

The solids content of the dispersion was 40%, and the particle size was 0.3 μm (monodisperse), and the glass transition temperature of the inner and outer shell was −40° C. The film forming temperature was less than 0° C.

To determine the gel content of the rubbers used, they were precipitated and dried at 70° C. and 25 kPa for 24 h. Subsequently one gram of each rubber was shaken in 100 ml of solvent at 23° C. for 24 h, and the gel formed was then centrifuged off.

The gel content in % was determined in accordance with the following relation:

$$\text{Gel content} = \frac{\text{weight of gel after extraction with solvent and drying}}{\text{amount of sample weighed into the solvent}}$$

When using tetrahydrofuran (THF) and toluene as the solvent, the gel contents were in each case above 50%.

The above-described components $B_1$-$B_7$ were mixed with polyesters and/or polycarbonates in an extruder to obtain the molding compositions according to the invention. The components A used were as follows:

$A_1$ polybutylene terephthalate having a specific viscosity of 1.65, measured on a 0.5% strength solution in phenol/o-dichlorobenzene (1:1) at 25° C. according to DIN No. 53,726/8, $A_2$ polycarbonate based on 2,2-di(4-hydroxyphenyl)-propane having a relative viscosity of 1.36 measured on a 0.5% strength solution in dichloromethane at 25° C.

In some examples (8–16), talcum and/or an ethylene/n-butylacrylate/acrylic acid terpolymer (65/30/5) having a melt index of 15 g/10 min (190° C., 2.16 kg load) were added.

The results of notched impact strength, hole notched impact strength and damaging energy measurements and the composition of the molding materials are shown in Tables 4 and 5.

TABLE 4

Example 1-7 (in these Examples the proportion of component A was always 80% by weight of $A_1$)

| Example | Component B | Notched impact strength kJ/m² 23° C. | Hole impact strength kJ/m² −20° C. | Plastechon test damaging energy Nm 23° C. |
|---|---|---|---|---|
| 1 | B₁ | 50 | 85 | 46 |
| 2 | B₂ | 55 | 87 | 49 |
| 3 | B₃ | 51 | 75 | 47 |
| 4* | B₄ | 9 | 30 | 19 |
| 5 | B₅ | 33 | 81 | 44 |
| 6 | B₆ | 45 | 82 | 49 |
| 7* | B₇ | 6 | 50 | 27 |

*Comparative examples

TABLE 5

Polyester-polycarbonate-elastomer blends

| | Composition (% by weight) | | | | | | Notched impact strength kJ/m² | | | |
|---|---|---|---|---|---|---|---|---|---|---|
| Example | Component B | Component A₂ | Component A₁ | Component B | Ethylene/n-butyl acrylate/acrylic acid copolymer (C) | Talcum, based on (A)–(C) | 23° C. | −20° C. | −40° C. | Vicat temperature °C. |
| 8 | B₁ | 50 | 40 | 6 | 4 | 0.1 | 65 | 41 | 11 | 125 |
| 9 | B₂ | 50 | 40 | 6 | 4 | 0.1 | 67 | 43 | 12 | 125 |
| 10 | B₃ | 50 | 40 | 6 | 4 | 0.1 | 64 | 44 | 10 | 125 |
| 11* | B₄ | 50 | 40 | 6 | 4 | 0.1 | 40 | 12 | 5 | 125 |
| 12 | B₅ | 50 | 40 | 6 | 4 | 0.1 | 63 | 40 | — | 125 |
| 13 | B₆ | 50 | 40 | 6 | 4 | 0.1 | 68 | 39 | — | 125 |
| 14* | B₇ | 50 | 40 | 6 | 4 | 0.1 | 36 | 9 | — | 125 |
| 15 | B₂ | 50 | 40 | 10 | | 0.5 | 61 | 30 | 10 | 138 |
| 16* | B₄ | 50 | 40 | 10 | | 0.5 | 30 | 8 | 3 | 138 |

*Comparative examples
The results show that the molding compositions according to the invention have a high impact strength even at low temperatures.

We claim:
1. A thermoplastic molding composition which contains

(A) 50–99% by weight of a polyalkylene terephthalate, a polycarbonate or a mixture thereof and
(B) 1–50% by weight of an elastomeric polymer having epoxy groups carboxyl groups or both groups on the surface, wherein component (B) is a graft polymer prepared by emulsion polymerization and has a glass transition temperature of below 0° C. and a gel content of not less than 50%.

2. A thermoplastic molding composition as claimed in claim 1, wherein the gel content of component (B) is not less than 70%.

3. A thermoplastic molding composition as claimed in claim 1, wherein component (B) has an inner core which is based on not less than 50% of butadiene.

4. A molding prepared from a molding composition as claimed in claim 1.

* * * * *